(12) United States Patent
Ashtikar

(10) Patent No.: US 9,432,503 B2
(45) Date of Patent: *Aug. 30, 2016

(54) METHOD TO TAG A PHONE CALL TO COMMUNICATE PURPOSE OF THE CALL

(71) Applicant: Intel Corporation, Santa Clara, CA (US)

(72) Inventor: Sachin Ashtikar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,772

(22) Filed: Dec. 22, 2014

(65) Prior Publication Data

US 2015/0111549 A1    Apr. 23, 2015

Related U.S. Application Data

(63) Continuation of application No. 13/721,768, filed on Dec. 20, 2012, now Pat. No. 8,938,223.

(51) Int. Cl.
*H04M 3/42* (2006.01)
*H04M 3/436* (2006.01)
*H04W 4/16* (2009.01)

(52) U.S. Cl.
CPC ..... *H04M 3/42042* (2013.01); *H04M 3/42051* (2013.01); *H04M 3/4365* (2013.01); *H04W 4/16* (2013.01); *H04M 3/436* (2013.01); *H04M 2203/2038* (2013.01)

(58) Field of Classification Search
USPC ........... 455/415, 414.1, 566, 416; 379/88.11, 379/88.21
See application file for complete search history.

(56) References Cited

U.S. PATENT DOCUMENTS

| 6,801,613 | B1 * | 10/2004 | Hamilton | H04M 3/523 379/207.02 |
|---|---|---|---|---|
| 8,750,939 | B2 | 6/2014 | Song et al. | |
| 2005/0287997 | A1 | 12/2005 | Fournier | |
| 2006/0034434 | A1 | 2/2006 | Kashi | |
| 2006/0034441 | A1 | 2/2006 | Kraft | |
| 2011/0096914 | A1 * | 4/2011 | Eng | H04M 1/2472 379/142.06 |
| 2012/0158472 | A1 * | 6/2012 | Singh et al. | 705/14.4 |
| 2014/0099929 | A1 * | 4/2014 | Vaglio et al. | 455/414.1 |

* cited by examiner

*Primary Examiner* — David Q Nguyen
(74) *Attorney, Agent, or Firm* — Jordan IP Law, LLC

(57) ABSTRACT

Phone calls may be tagged with the importance or the context of the call to be displayed along with the caller ID information on the display of a receiving phone. The context information is thus made available even before the call is answered to aid the user in determining whether or not to answer the call or how long thereafter it would be appropriate to wait before the call is returned.

5 Claims, 4 Drawing Sheets

METHOD TO TAG A PHONE CALL TO COMMUNICATE PURPOSE OF THE CALL

CROSS REFERENCE TO RELATED APPLICATIONS

This application is a continuation of U.S. patent application Ser. No. 13/721,768; entitled "METHOD TO TAG A PHONE CALL TO COMMUNICATE PURPOSE OF THE CALL" filed Dec. 20, 2012.

FIELD OF THE INVENTION

Embodiments of the present invention are directed to tagging phone calls and, more particularly, to tagging a cell phone call with contextual information.

BACKGROUND INFORMATION

A telephone service commonly known as "Caller ID" allows a person who is receiving a telephone call to determine the calling party before the call is answered. Caller ID is available on landline phones and fairly standard for cellular phones. Caller ID involves the calling telephone device to transmit or otherwise have made available information, such as the phone number of the calling device, the name of the calling party, etc. The receiving telephone can use the information to determine whether to block the call, allow the call to go through, or to display the information on a display at the receiving telephone.

The receiving telephone, particularly in the cellular arena, has many options of what to do with Caller ID information. For example, it may associate the Caller ID with names or nicknames from an address book to be displayed, associate different ringtones or ring-back tones, associate pictures or photos to be displayed, etc.

The calling telephone device typically has fewer options available. For example, the only option the caller may have is to block the transmission of its Caller ID information resulting in "unknown" to be displayed at the receiving telephone.

Typically, when caller initiates the phone call to the receiver, the receiver does not have any idea about the caller's need intention or the urgency of the call. The receiver can only see who is calling. Based on the receiver's condition (busy/not busy) the receiver makes a judgment call as to whether or not to answer the incoming call immediately. At times, if the caller is in real need, perhaps due to an urgent need or emergency situation, for example, there is no way to communicate that context to the receiver unless the call is answered. The caller may have to resort to frantic calling to convey the urgency. In other scenarios, where receiver is not able to see the incoming call, the call logs (missed calls) do not indicate the call priority either. It is again left to the receiver to judge and decide whether to return the call later or not. Voice mail can provide some relief here, but voice mail needs to be accessed and listened to and often people do not take the time to check voicemail.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Described is way to tag calls with the importance or the context of the call that may be displayed along with the caller ID information on the display of a receiving phone. The context information is thus made available even before the call is answered to aid the user in determining whether or not to answer the call or how long thereafter it would be appropriate to wait before the call is returned.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
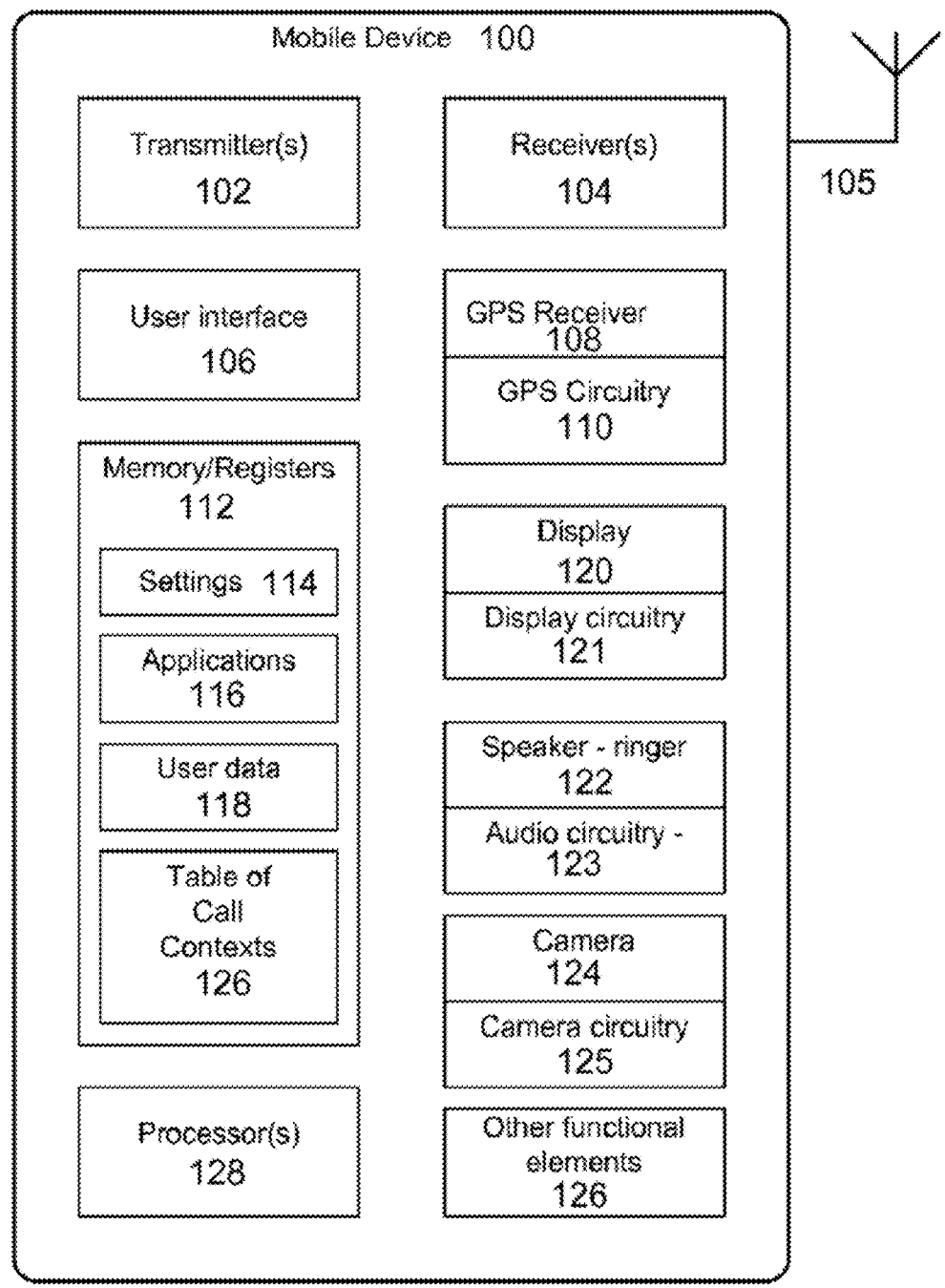
FIG. 1 is a block diagram of a mobile device according to one embodiment.

FIG. 1 illustrates an embodiment of a mobile device or system. The mobile device may comprise a phone, a cell phone, a smart phone, a tablet, or any other device which, among other things, is capable of making calls. In some embodiments, a mobile device 100 includes one or more transmitters 102 and receivers 104 for transmitting and receiving data. In some embodiments, the mobile device includes one or more antennas 105 for the transmission and reception of data, where the antennas may include dipole, monopole antennas, patch antennas, etc. The mobile device 100 may further include a user interface 106, including, but not limited to, a graphical user interface (GUI) or traditional keys. The mobile device 100 may further include one or more elements for the determination of physical location or velocity of motion, including, but limited to, a GPS receiver 108 and GPS circuitry 110.

The mobile device 100 may further include one or more memories or sets of registers 112, which may include non-volatile memory, such as flash memory, and other types of memory. The memory or registers 112 may include one more groups of settings 114 for the device 100, including default settings, user-set settings established by user of the mobile device, and enterprise-set settings established by an enterprise, such as an employer, who is responsible for IT (information technology) support. The memory 112 may further include one or more applications 116, including applications that support or control operations to send or receive a context of a call according to embodiments. The memory 112 may further include user data 118, including data that may affect limitations of functionality of the mobile device and interpretations of the circumstances of use of the mobile device. For example, the user data 118 may include calendar data, contact data, address book data, pictures and video files, etc.

The mobile device 100 may include various elements that are related to the functions of the system. For example, the mobile device may include a display 120 and display circuitry 121 for displaying caller ID and context information; a microphone and speaker 122 and audio circuitry 123 including audible signaling (e.g., ringers); a camera 124 and camera circuitry 125; and other functional elements such as a table of call contexts 126, according to one embodiment. The mobile device may further include one or more processors 128 to execute instructions, including instructions regarding the calling contexts.

Figure 2:
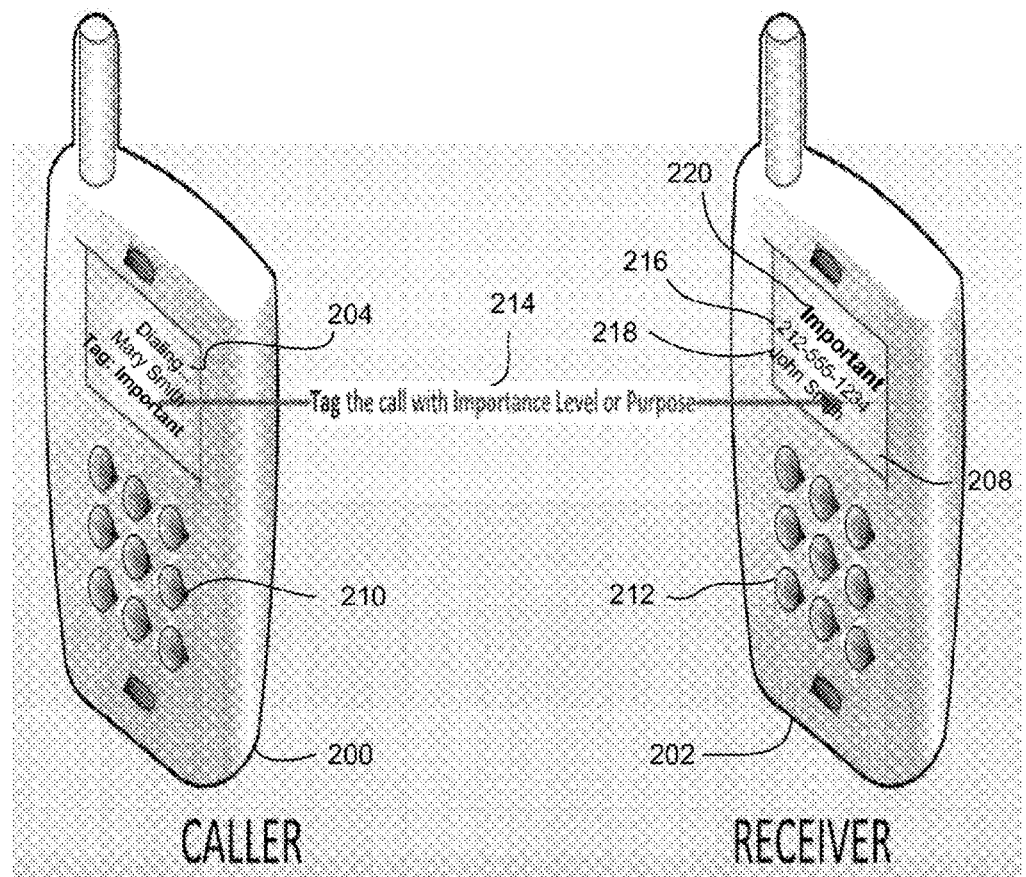
FIG. 2 is a block diagram showing a caller phone and a receiver phone where the caller phone can tag a call with an importance level or purpose to be displayed on the receiver phone.

Referring now to FIG. 2, there is shown two mobile devices, which may comprise a caller phone 200 and receiver phone 202. While the caller phone and receiver phone, 200 and 202, are shown to be the same type of phone, this is for illustrative purposes only. In practice the caller phone 200 and the receiver phone 202 may be different styles, brands, form factors, etc. Each of the caller phone 200 and receiver phone 202 may comprise mobile devices as shown and described above in FIG. 1. The caller phone 200 may comprise a display 204 and a user interface 210 which may include keys as shown, or a graphical user interface (GUI) for entering phone numbers, data or commands. Likewise, the receiver phone 202 may include a display 208 and a user interface 212 for similar functions.

According to one embodiment, the caller phone 200, when making a phone call, may send context information 214 of the call to the receiver phone 202. For example, sending call priority/importance along with the mobile phone call would enable a caller to communicate the importance of the call or the need to the receiver more effectively.

In the example shown in FIG. 2, the caller phone 200 may belong to John Smith and is making a call to the receiver phone 202 belonging to Mary Smith. The caller phone may have a tag function that tags the call with an information tag 214 indicating the importance level or purpose of the call. On the receiver phone 202 the display 208 may display the caller ID information which may include the phone number 216 of the caller phone 200 and the name 218, John Smith, associated with the caller phone 200. In addition, the tag information 214 may also be graphically displayed, in this case "important" 220. This "important" tag 220 may cause Mary, the user of the receive phone, to take the call immediately or if not possible, to return the call as soon as possible. If, on the other hand, the call was tagged 220 with "low importance" or some other less urgent tag, then Mary may not answer and return the call at her leisure.

Thus, considering the call importance, the receiver can make a better judgment to answer the call immediately despite being busy. In case the call is missed due to receiver being busy or away from the phone 202, the call logs will show the missed call along with the context tag indicating the importance of the call. This will allow the receiver to take immediate action and not wait to hear his/her voice mails to understand the need.

This concept can then be used for variety of purposes other than just communicating importance of the call. For instance, call tagging may be extended to pass not only the importance of the call but it could also do various other things such as passing the purpose of the call in the form of a short message that may displayed as is the caller ID. For example, when a call is received, it may be tagged with a question (e.g., need me to stop at supermarket?), a short piece of information (e.g. starting my coffee break), updating a status (e.g. will be busy in 10 minutes), marketing information (your bill is overdue), etc. Based on the tag, the phone on the receiver end could build further intelligence and provide much better user experience and value added service back to the end user. In other words, the context tags 214 may aid the user in determining not just the importance of the call, but in ascertaining the caller's future availability for a return call if the call cannot be answered immediately or allow the receiver of the call to prepare for the conversation once the voice call actually occurs.

Figure 3:
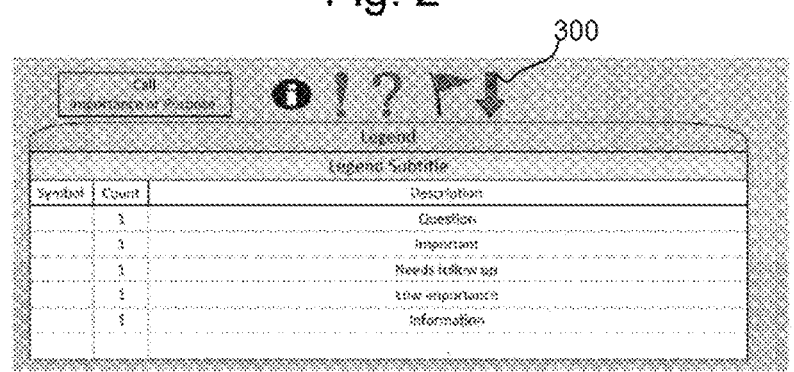
FIG. 3 is an example menu which may be used to tag a call.

Referring now to FIG. 3, there is shown a table comprising context information that may be sent along with a dialed phone call to be displayed. The table may be stored in the memory 112 of the mobile device in the table of call context module 126, for example, as shown previously in FIG. 1. The non-exhaustive list of predefined context tags may include "Question", "Important", "Needs Follow Up", "Low Importance", and "Information". In addition to the text tags discussed, icons relaying the same message, such as "i" "!", "?", a flag symbol, and "down arrow", 300, may also be used by the caller phone 200 and displayed on the receiver phone 202.

Figure 4:
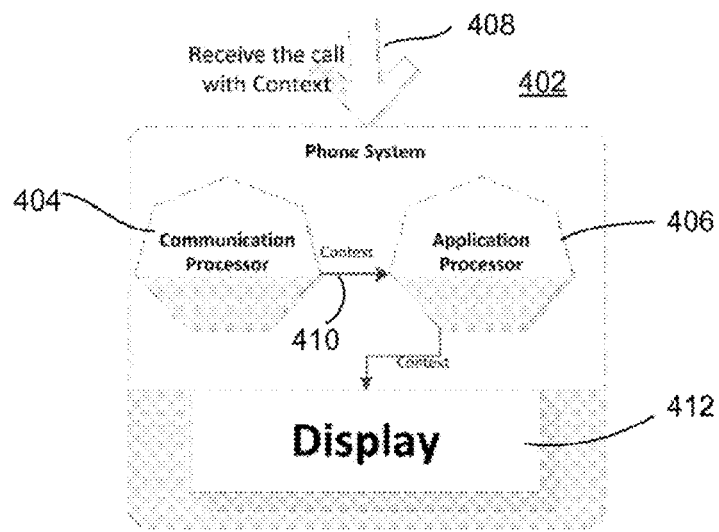
FIG. 4 is a block diagram showing context information received with the call according to one embodiment.

Referring now to FIG. 4, there is shown a block diagram illustrating one embodiment for passing context tag information with a call. As shown, a receiver phone 402, may include at least a communication processor 404 and an application processor 406. These processors 404 and 406 may comprise a single processor performing both functions or multiple processors as shown. When a call is received, such as when the phone number of the receiver phone 402 is dialed by a caller phone (not shown), a network, such as a cellular network transmits the call which is received 408 by the receiver phone 402. In this case, the received call 408 includes the context tag entered by the caller when dialing the call. The phone call carries the context tag along with it and gets proliferated through the network until it reaches the destination. The communications processor recognizes the phone number and causes the receiver phone 402 to ring. The context tag information 410 may be passed to the application processor 406 which interprets the context tag and displays it as text on the display 412, which may also display the caller-id information.

Figure 5:
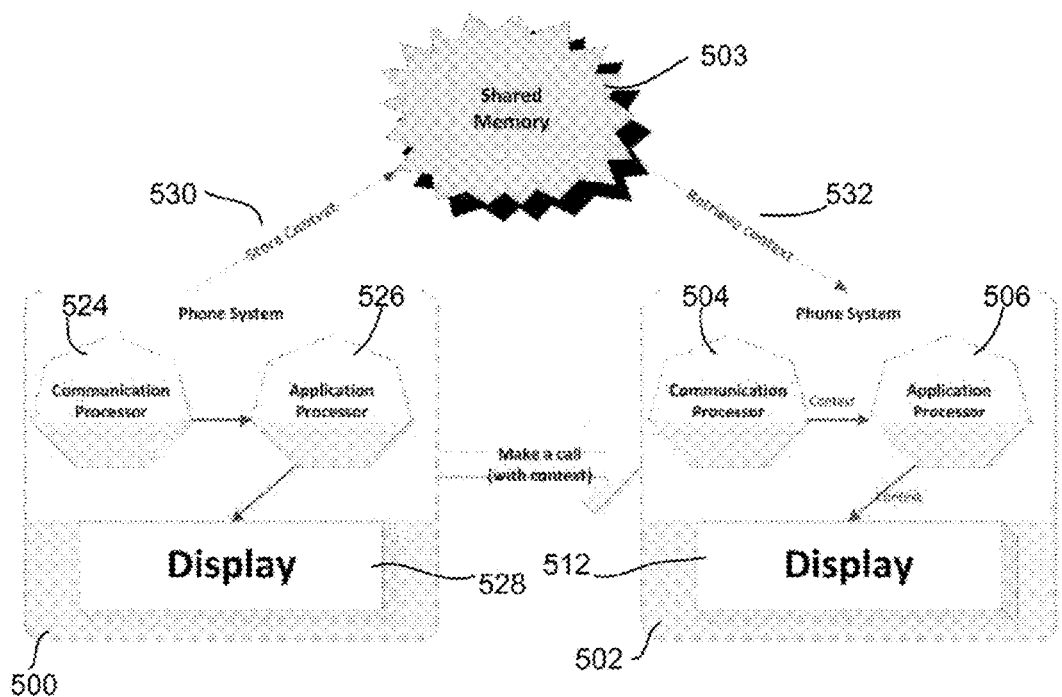
FIG. 5 is a block diagram showing context information for a call transferred to a shared memory on a network according to one embodiment.

Referring now to FIG. 5, there is shown another embodiment. Here, a caller phone 500 and a receiver phone 502 may both have access to a shared memory on the network or cloud 503. As before, the receiver phone 502, may include at least a communication processor 504 and an application processor 506. Again, these processors 504 and 506 may comprise a single processor performing both functions or multiple processors as shown. A display 512 may also be present. Similarly, the caller phone 500 may comprise a communication processor 524 and an application processor 526 and a display 528, as shown for example in FIG. 2. In this case, the context tag information may be entered on the caller phone 500 while making a call. For example, by pressing a number, corresponding to a predefined context message, followed by # key. Thus, the context tag is transferred 530 to the shared memory 503 on the network. The receiving phone 502 can query 532 the shared memory 503 for any additional context and retrieve it for further processing before rendering it for the user to see on the display 512, prior to answering the call.

Figure 6:
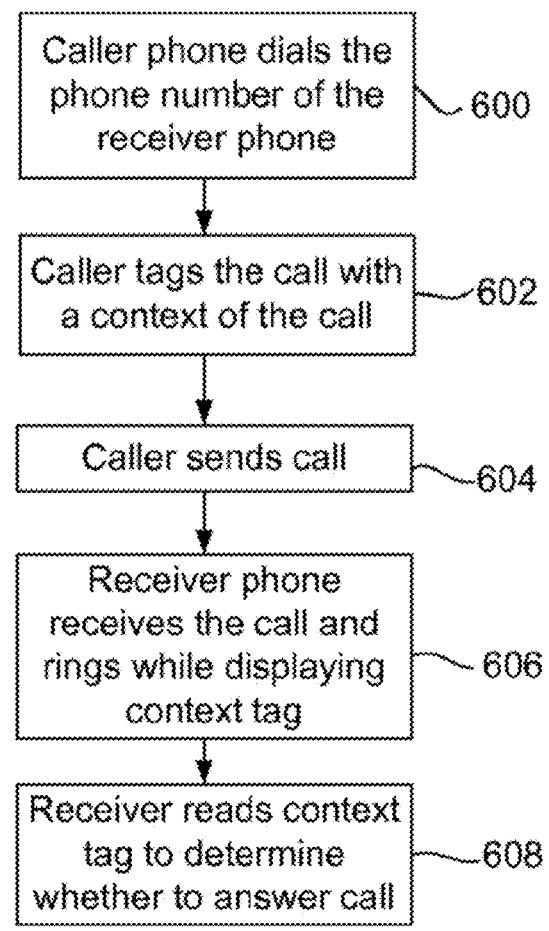
FIG. 6 is a flow diagram illustrating one embodiment of sending and receiving calls with context tags.

FIG. 6 is a flow diagram according to one embodiment. At block 600 a caller initiates a call to a desired party. The caller may do so by punching in a phone number on a keypad or GUI, using a look up from a stored address book, using a voice command, or any other method of dialing. In block 602, before sending the call the user can attach a context tag indicating the general purpose of the call. The user may do this from a menu of predefined context tags, by pushing a button associated with a particular context tag, or perhaps speaking the tag for voice command enabled devices. In other embodiments the caller may also be able to customize the context tag by entering a short message or question. In block 604, the caller sends the call. In block 606, the receiving phone receives the call along with the context tag, and caller ID information if available. In response to the call, the receiver phone rings, as normal, but also displays the context tag for the receiving party to view. In this manner, the receiving party may use the context tag information to aid in determining whether or not to answer the call immediately, return the call at a later time appropriate to the context tag, or perhaps at least have a general idea of the nature of the call prior to answering.

According to embodiments, in one example, at least one machine readable storage medium comprises a set of instructions which, when executed by a processor, cause a first mobile device to receive a telephone call from a second mobile device, receive caller ID information corresponding to the second mobile device, receive a context tag sent by the second mobile device, and display the caller ID information and the context tag on a display of the first mobile device prior to the telephone call being answered.

In another example, the at least one machine readable medium as recited above the context tag is displayed as text indicating the importance the telephone call.

In another example, the at least one machine readable medium as recited above, the context tag is displayed as a symbol indicating the nature of the call.

In another example, the at least one machine readable medium as recited above wherein the context tag comprises a text message or text question.

In another example, the at least one machine readable medium as recited above wherein the context tag is received with the telephone call.

In yet another example the at least one machine readable medium as recited above further to query a memory on a network shared with the second mobile device, and to receive the context tag for the telephone call from the network.

In another example the at least one machine readable medium as recited above further to initiate a telephone call from dialed number, send caller ID information with the telephone call, and tag the telephone call with a context tag.

Another example may include a method, comprising a first mobile device receiving a telephone call from a second mobile device, receive caller ID information corresponding to the second mobile device, receive a context tag sent by the second mobile device, and display the caller ID information and the context tag on a display of the first mobile device prior to the telephone call being answered.

In another example the method as recited above wherein the context tag is displayed as text indicating the importance the telephone call.

In another example the method as recited above, wherein the context tag is displayed as a symbol indicating the nature of the call.

In another example the method as recited above wherein the context tag comprises a text message or text question.

In another example the method as recited above wherein the context tag is received with the telephone call.

In another example, the method as recited above further comprises query a memory on a network shared with the second mobile device, and receive the context tag for the telephone call from the network.

In yet another example a mobile phone device, comprises a user interface to receive user input, a display, a memory including a table of call contexts, wherein when a call is dialed a context tag for the call is entered with the user interface and the context tag is sent with the call to be viewed prior to the call being answered.

In another example, the mobile phone as recited above the context tag comprises text indicating the importance the telephone call.

In another example, the mobile phone as recited above the context tag comprises a symbol indicating the nature of the call.

In another example, the mobile phone as recited above the context tag comprises a text message or text question.

In another example, the mobile phone as recited above the received context tag is displayed on the display of the mobile phone.

In another example, the mobile device as recited above further comprises means to send the context tag to a memory on a network shared with a called mobile device.

The above description of illustrated embodiments, including what is described in the Abstract, is not intended to be exhaustive or to limit the precise forms disclosed. While specific embodiments of, and examples are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. At least one non-transitory machine readable storage medium comprising a set of instructions which, when executed by a processor, cause a first mobile device to:
   receive an indication of a telephone call from a second mobile device;
   receive caller identification information corresponding to the second mobile device;
   receive a context from the second mobile device; and
   display the context on a display when the caller identification is displayed prior to the telephone call being answered,
   wherein the context includes an icon and/or text indicating the purpose of the telephone call, wherein the text is a question.

2. The at least one machine readable medium as recited in claim 1, further to cause the first mobile device to:
   send a context with an outgoing telephone call.

3. A method, comprising:
   a first mobile device receiving a telephone call from a second mobile device;
   receiving caller identification information corresponding to the second mobile device;
   receiving a context sent by the second mobile device; and
   displaying the context on a display when the caller identification is displayed prior to the telephone call being answered, wherein the context includes an icon and/or text indicating the purpose the telephone call, wherein the text is a question.

4. A mobile call device, comprising:
a user interface to receive user input;
a display;
a memory to store a plurality of call contexts, wherein when a call is dialed a context for the call is entered with the user interface and the context is sent with the call to be viewed prior to the call being answered, wherein the context includes an icon and/or text indicating the purpose of the telephone call, wherein the text is a question.

5. The mobile device as recited in claim 4, further comprising:
means to send the context to a memory on a network shared with a called mobile device.

\* \* \* \* \*